CEILING LIGHT DIFFUSER SYSTEM

Original Filed April 12, 1965 2 Sheets-Sheet 1

INVENTOR.
LEONARD F. MILNER.
BY Bernard Kriegel
ATTORNEY.

CEILING LIGHT DIFFUSER SYSTEM
Original Filed April 12, 1965 2 Sheets-Sheet 2
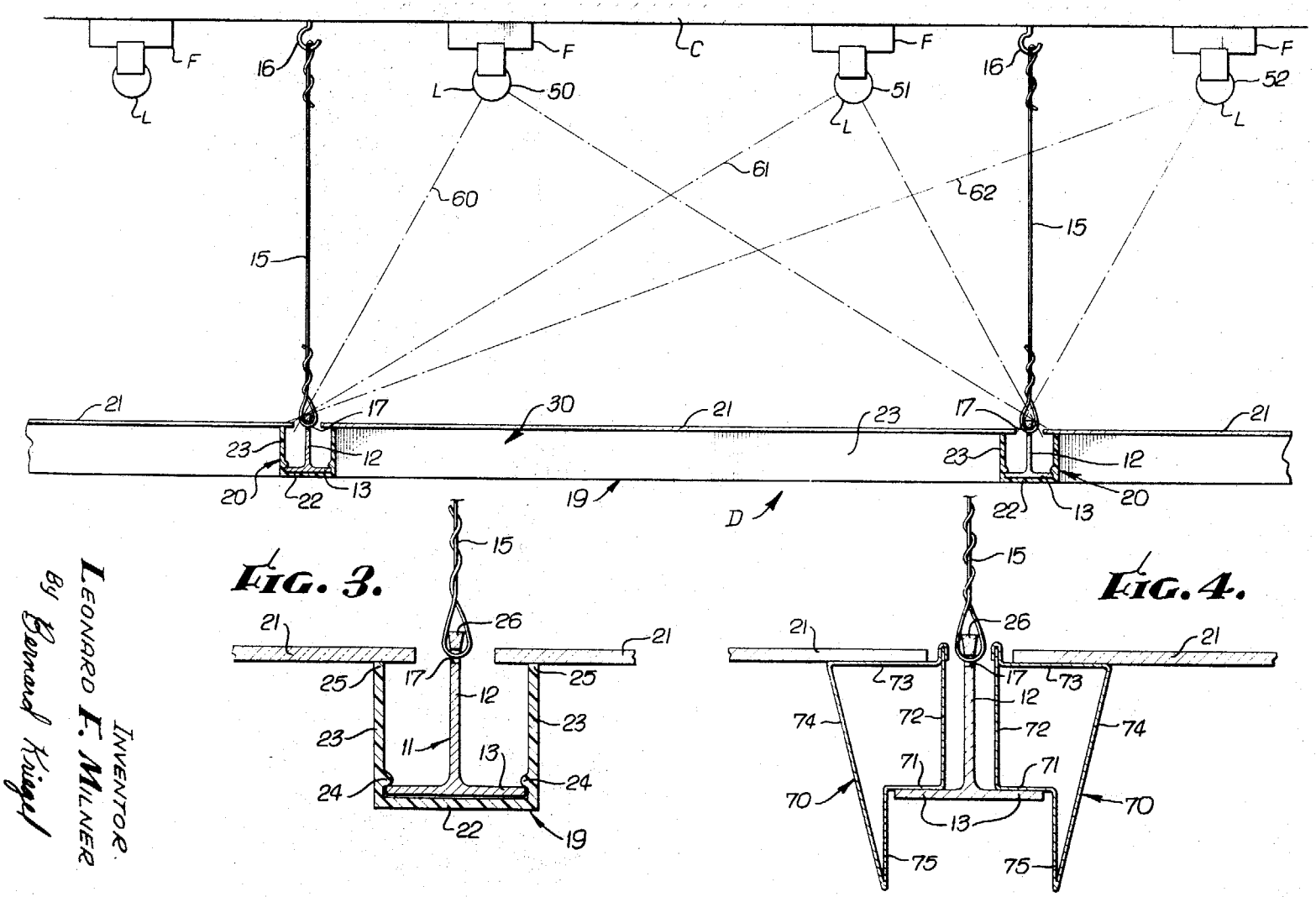
INVENTOR.
LEONARD F. MILNER
By Bernard Kriegel
ATTORNEY.

United States Patent Office

Re. 27,369
Reissued May 16, 1972

27,369

CEILING LIGHT DIFFUSER SYSTEM

Leonard F. Milner, Los Angeles, Calif., assignor to Integrated Ceilings Inc., Los Angeles, Calif.

Original No. 3,336,471, dated Aug. 15, 1967, Ser. No. 447,121, Apr. 12, 1965. Application for reissue Oct. 20, 1969, Ser. No. 869,975
Int. Cl. F21s
U.S. Cl. 240—9 R 15 Claims

Matter enclosed in heavy brackets [ ] appears in the original patent but forms no part of this reissue specification; matter printed in italics indicates the additions made by reissue.

ABSTRACT OF THE DISCLOSURE

A light diffuser system suspended from a ceiling below a light source and having a framework of inverted T-bars defining rectangular openings, channel-shaped members or a frame structure supporting light diffusers across the openings such that the diffusers lie in a plane contiguous the plane of the upper ends of the vertical T-bar flanges to substantially entirely eliminate T-bar shadow cast by the light source on the diffusers.

The present invention relates to lighting systems, and more particularly to systems and apparatus for diffusing light originating from lighting fixtures such as those suspended from ceilings.

Illumination derived from fluorescent and similar lighting fixtures mounted on a ceiling have been distributed through the use of diffusers carried by a supporting structure suspended from the ceiling below the lighting fixtures. The fluorescent lights or lamps have cast shadows of portions of the supporting structure on the diffusers, resulting in non-uniform illumination on the light transmitting diffuser elements. If the supporting structure includes inverted T-bar members, shadows of the vertical central webs of the T-bars are cast on the diffuser elements. Moreover, portions of the T-bars are readily visible and unsightly. Their appearance can be improved by painting them a suitable color, but such painting increases the cost of the system.

Accordingly, it is an object of the present invention to provide a light diffuser system embodying an inverted T-bar supporting frame structure, in which substantially no shadow of the inverted T-bars is cast on the diffusion members by the light source thereabove, insuring uniform light distribution over the light transmitting areas of the diffuser assembly.

Another object of the invention is to provide a light diffuser system embodying an inverted T-bar supporting frame structure, in which light shadows on the diffuser members are eliminated, and in which the T-bars themselves are substantially concealed from view, thereby eliminating the need for their painting or other subsequent treatment.

A further object of the invention is to provide a light diffuser system in which the diffuser members are supported in such manner with respect to their supporting structure as to eliminate the casting of shadows on the diffuser members, and in which the supporting devices for the diffuser members substantially or completely cover or conceal the supporting structure itself.

An additional object of the invention is to provide a light diffuser system in which the diffuser members are supported in such manner with respect to their supporting structure as to eliminate the casting of shadows on the diffuser members, the system being relatively simple, economical and pleasing to the eye.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIG. 2 is a vertical section through the lighting system disclosed in FIG. 1, with the diffuser assemblies in assembled position on the supporting structure;

FIG. 3 is an enlarged vertical section of a portion of the apparatus disclosed in FIG. 2;

FIG. 4 is a view similar to FIG. 3 of a modified form of apparatus;

Figure 1:
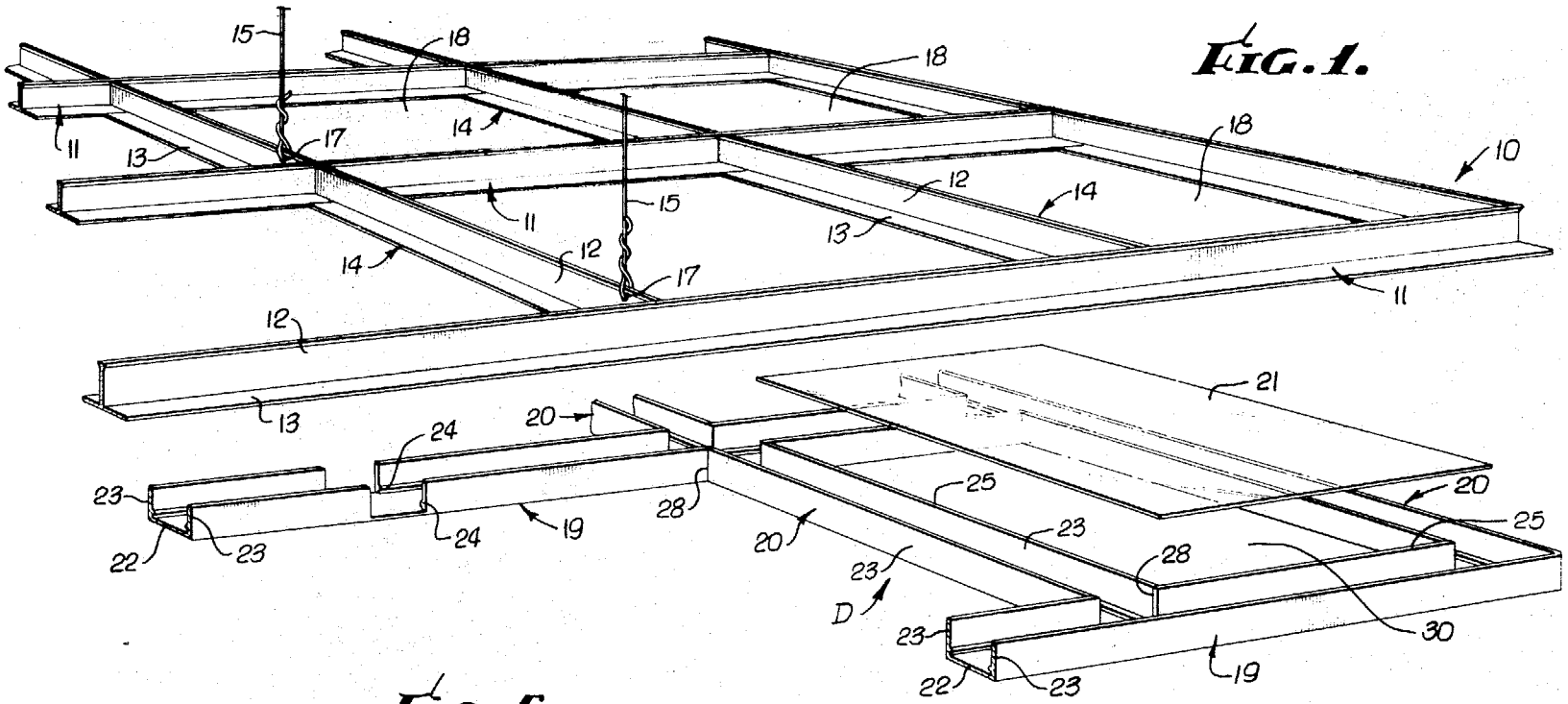
FIGURE 1 is an isometric, exploded view of a system embodying the invention, including a supporting frame structure and a diffuser assembly disclosed below the structure.

The apparatus or system disclosed in the drawings can be used to cover substantially the entire area of a ceiling C, if desired, for the purpose of diffusing light emanating from a plurality of fixtures F mounted on the ceiling. As shown in FIG. 2, parallel rows of lighting fixtures F are carried from the ceiling and a light diffuser apparatus D is suspended from the ceiling in spaced relation to and below the fixtures so as to fully cover the latter and diffuse the light emanating from the fluorescent tubes or lamps L mounted on the fixtures.

A supporting frame structure 10 is suspended from the ceiling. As specifically disclosed, this frame structure includes longitudinally arranged horizontal members 11 which are in parallel relation to each other and which may extend the entire length of the ceiling, if desired. Each horizontal member is of inverted T cross section, comprising a T-bar having a vertical flange or web 12 and opposed lower horizontal flanges 13 integral with the lower end of the latter. Interconnecting the longitudinal supporting members or T-bars 11 are cross supporting members, spreaders or separators 14 which are also in the form of inverted T-bars. These cross T-bars are of a proper length to separate the longitudinal bars 11 and maintain them in parallel spaced relation to one another. The cross T-bars 14 are of the same cross-sectional dimension and of the same shape as the longitudinal T-bars 11, and each includes a vertical flange or web 12 and lower opposed horizontal flanges 13 integral with its lower end.

The longitudinal T-bars and cross T-bars are suitably secured together in a know manner, and are suspended from the ceiling C the appropriate distance therebelow in parallel relation to the ceiling by hanging wires 15, the upper ends of which are attached to suitable upper connectors 16 secured to the ceiling, and the lower end of which are suitably attached to the T-bars 11 or 14, as by passing them through holes 17 in the upper portions of their vertical webs 12 and then twisting each wire ıpon itself, as disclosed in the drawings. The cross-nembers or spreaders 14 are secured to the longitudinal nembers 11 in appropriate spaced relation to form rec-angular or square openings 18 therewith which are .dapted to be covered by the diffuser assembly D. As hown in FIGS. 1, 2 and 3, this assembly D covers the ectangular openings, and also hides the supporting frame tructure 10 itself. The diffuser assembly includes T-bar over members 19, 20 which are mounted on the T-bars 1, 14 in such manner as to support diffusers 21 across he rectangular openings 18, the covers also concealing he T-bars from view.

Each cover and supporting member 19, 20 includes a ower horizontal web 22, the ends of which merge into ıpposed vertical arms 23 which are spaced apart substan-ially the width across the horizontal flanges 13 of a T-ıar. The arms have opposed inner ribs 24 projecting from heir inner walls above the central web 22 of the channel ır cover so that the cover can be snapped upwardly over T-bar, the flanges 13 of the latter snapping through the ibs 24 to a position therebelow. The arms 23 are flexible nd will expand outwardly sufficiently to allow the flanges 3 to snap relatively through the rib, the arms then con-racting or retracting to their original position so as to etain the ribs 24 over the flanges 13, the flanges then ıeing preferably closely adjacent to the cover web 22. With the cover so mounted over a T-bar, the upper ends 5 of the arms terminate a slight distance below the upper nd 26 of the vertical flange or web 12 of the inverted T-bar.

The covers or channels include longitudinal members 9 adapted to fit over the longitudinal T-bars 11, and ross channels to covers 20 adapted to fit over the cross T-bars or spreaders 14. The longitudinal covers 19 have heir arms 23 notched or removed where the covers ex-end across the cross members 14, whereas the cross overs or channels 20 only have a length as to extend ıetween a pair of parallel longitudinal covers 19, the nds 28 of each cross cover being disposed closely adja-ent to the longitudinal members and, in fact, abutting hereagainst. Actually, the longitudinal and cross covers 9, 20 define rectangular or square openings 30 having ıpper edges 25 on which the diffusion members 21 can ıe supported. These diffusers, which are preferably of lat form and made of glass, plastic, or the like, are arger in area than the area of the opening 30 so that each liffuser rests upon the upper ends 25 of the arms of he longitudinal and cross cover members, as disclosed in IGS. 2 and 3.

In the assembly of the system illustrated in FIGS. 1, 2 nd 3, the supporting frame structure 10, comprising the nverted longitudinal and cross T-bars 11, 14, is suitably uspended from the ceiling, after which the longitudinal nd cross channels or covers 19, 20 are fitted upwardly ıver the inverted T-bars, the cross members 20 abutting he longitudinal members 19. The ribs 24 extending in-vardly from the arms 23 of each channel member 19, 0 snap upwardly over the lower horizontal flanges 13 ıf each T-bar, whereby the covers are retained in assem-ıled position on the T-bars. Each diffuser member 21 an then be moved through the rectangular or square ıpening 30 defined by the longitudinal and cross cover nembers and placed upon the upper ends or edges 25 ıf the arms defining its companion opening, each diffuser ying in a plane which is close to the horizontal plane n which the upper ends 26 of the T-bars 11, 14 lie.

The cover members 19, 20 support the diffusers in an levated position along the T-bars so that the light manating from the fluorescent tubes or lamps L will ast substantially no shadow upon the visible portions ıf the diffuser members 21. In addition, the covers 19, 0 conceal the T-bars 11, 14. The covers may be made ıf any suitable material and in any desired color so hat when snapped into place on the T-bars the light dif-fuser system needs no subsequent finishing. As an example, the cover members 19, 20 can be made of a high impact styrene, polyethylene, or polypropylene, or they may be made of metal such as thin gauge aluminum or steel, or the channel-shaped cover members may be made of extruded aluminum. The particular material selected has flexibility so that the arms 23 can spring apart slightly when the ribs 24 pass over the T-bar flanges 13, the arms then inherently returning to their initial inward position substantially parallel to one another.

Figure 5:
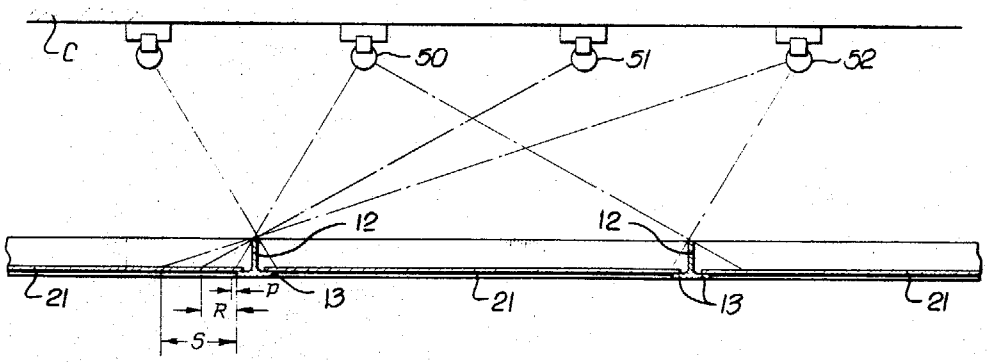
FIG. 5 is a vertical section through a known lighting system, and corresponding to FIG. 2.

The elimination of any shadows cast by the T-bars on the visible portion of the diffuser members 21 becomes apparent from a consideration of FIG. 5, which shows diagrammatically a known, prior light diffuser system in which the diffuser panel members 21 rest upon the lower horizontal flanges 13 of the T-bars. In FIG. 5, the T-bar system can be suspended from the ceiling in the same manner as the system illustrated in FIGS. 1 and 2. As shown in FIG. 5, the light emanating from a fluorescent lamp 50 will strike the vertical flange or web 12 of an inverted T-bar extending parallel thereto and may cast a small shadow P on the marginal portion of the light diffuser panel. Light emanating from the next fluorescent lamp 51 will strike the same vertical flange 12 and cast the shadow of such flange over a substantial width R of the light diffuser panel. The light emanating from a third lamp 52 will strike the same vertical flange and cast a still longer shadow S on the light diffuser panel. The intensity of the shadow cast by the second lamp 51 will be less than that cast by the first lamp 50, and the intensity of the shadow cast by the third lamp 52 will be less than that cast by the second lamp 51, but such shadows will still be visible by the observer.

As contrasted with FIG. 5, applicant's light diffuser system eliminates shadows. The absence of shadows is demonstrated in FIG. 2, in which the parallel rows of fluorescent tubes L are mounted on the ceiling with the light diffuser apparatus D suspended a typical distance therebelow. As shown, the light 60 from one of the fluorescent tubes 50 will strike the vertical flange 12 of a horizontal T-bar parallel thereto, but the shadow of such horizontal flange will be cast upon the cover member 19, and no portion of such shadow will be thrown upon the diffuser member or element 21 itself. The same is true of the light 61 emanating from a second row 51 of fluorescent tubes. Such light will strike the vertical flange or web 12 of the same T-bar member, and it will also strike the diffuser element 21 at its edge. The shadow of the vertical web will be thrown almost entirely upon the cover 19, and substantially no portion of the shadow will strike the diffuser element, except possibly at its marginal portion that overlies the arm 23 of the cover. The shadow cast by the light 61 emanating from a second row 51 of fluorescent tubes will, of course, not be as great as the shadow resulting from the other fluorescent lamp 50 because of the greater distance the second fluorescent lamp is removed from the vertical web.

Another row 52 of fluorescent lamps also tends to cast a shadow of the same inverted T-bar, but the light 62 emanating from such fluorescent lamps will strike the T-bar and cast its shadow substantially entirely upon the arm 23 of the cover 12. Substantially none of the shadow will be cast upon a visible portion of the diffuser element 21, except possibly in the region immediately adjacent to the supporting arm 23. However, the third fluorescent lamp 52 is still further removed from the T-bar member and the shadow that it tends to cast is of much lesser darkness than that cast by the fluorescent lamps 50, 51 previously referred to, as well as the intensity of its illumination upon the diffuser element 21.

The fluorescent lamps L combine with one another to provide a substantially uniform lighting over the entire visible area of each diffuser member 21. As a practical matter, there is a complete absence of shadows cast upon the diffuser members that are visible from the floor therebelow.

The system illustrated in FIGS. 1, 2 and 3 is relatively economical to provide. The cover members 19, 20 can be formed easily and inexpensively, and their assembly on the supporting frame structure 10 is accomplished very rapidly, merely by snapping them over the T-bars 11, 14. The diffuser members 21 are readily mounted in place, as by shifting them upwardly through the rectangular openings 30 and then lowering them into place upon the arms 23 defining the rectangular openings that the diffuser members are to cover. As was noted above, the cover members 19, 20 not only act as a support for the diffusers 21 in the upper plane of the T-bars, but they also serve to conceal the T-bars 11, 14, and can have a pre-existing finish thereon of the desired color. The cross cover members 20 abut the longitudinal cover member 19 and provide no spaces through which light leaks can occur.

In the form of invention illustrated in FIG. 4, rectangular supporting frames 70 are provided, only one side of which is disclosed. It is to be understood, however, that each of the four sides of the frame have the same cross-section as illustrated in FIG. 4. As shown, each of the sides includes a horizontal base portion 71 adapted to rest upon a horizontal T-bar flange 13, an outer side 72 extending upwardly therefrom, and a horizontal top 73 disposed adjacent to the upper end 26 of the vertical T-bar web upon which a diffuser member or plate 21 can rest. Extending downwardly and outwardly of the horizontal top 73 is an inner side portion 74 of the frame that extends a substantial distance below the horizontal flanges 13 of the T-bar, the enclosure of the side of the frame being completed by a depending skirt 75 extending from the inner edge of the horizontal base 71 and merging into the lower end of the tapered frame side 74.

A rectangular frame 70 such as illustrated in FIG. 4 is moved upwardly through a rectangular opening 18 provided by the longitudinal and cross inverted T-bar frame structure 10, and is then brought to rest, with the horizontal bases 71 resting upon the horizontal flanges 13 of the T-bars. The diffuser member 21 can then be moved upwardly through the frame opening 18 and brought to rest upon the horizontal tops 73 of the four sides of the frame. The length and width of the diffuser member 21 is greater than the corresponding length and width of the opening 18 of the frame 10 so that the diffuser member 21 can rest on the horizontal tops 73. When in such position, it lies substantially in a horizontal plane including the upper ends 26 of the vertical webs or flanges 12 of the T-bars 11, 14, or in substantially the same position as the diffuser members 21 in the other form of the invention.

The fluorescent tubes or lamps L will be unable to cast any visible shadow of the T-bars 11, 14, or of the frame members 70 themselves, upon the diffuser members of plates 21. The same comparison can be made with respect to the form of invention disclosed in FIG. 4 as was made in comparing FIG. 2 with the prior arrangement illustrated diagrammatically in FIG. 5. Not only will no shadow be cast upon the portion of each diffuser member 21 overlying a frame opening 18, but the provision of the frame 70 with its lower portion 75 depending a substantial distance below the horizontal flanges 13 of the T-bars hides such horizontal flanges to a considerable extent from view. They are only visible from a position directly below a particular T-bar. Anyone looking upwardly at the assembly at an angle will not see the T-bars since they are obstructed from view by the depending skirts 75.

I claim:

1. In a light diffuser system: a horizontal supporting frame adapted to be carried by and disposed below a ceiling structure, said frame comprising longitudinal members and cross members extending between said longitudinal members and defining openings therewith, each member including a vertical flange and a horizontal flange at the lower end of said vertical flange; light diffusing devices for said openings, each device including a light diffuser; *a light source above said vertical flanges and diffusers and comprising one or more lamps, at least one of said lamps being exposed to a plurality of said diffusers for a plurality of said openings to project light on said plurality of diffusers;* and means [separate from] *other than* said members *and diffusers carried by said horizontal flanges* supporting said light [diffuser] *diffusers* on said members with said diffusers spaced from and disposed above said horizontal flanges and lying in a horizontal plane closely adjacent to the horizontal plane of the upper ends of said vertical flanges, *whereby shadows of said vertical flanges cannot be cast on said diffusers.*

2. In a light diffuser system: a horizontal supporting frame adapted to be carried by and disposed below a ceiling structure, said frame comprising longitudinal members and cross members extending between said longitudinal members and defining openings therewith, each member including a vertical flange and a horizontal flange at the lower end of said vertical flange; light diffusing devices for said openings, each device including a light diffuser; *a light source above said vertical flanges and diffusers and comprising one or more lamps, at least one of said lamps being exposed to a plurality of said diffusers for a plurality of said openings to project light on said plurality of diffusers;* and means [separate from] *other than* said members *and diffusers and resting upon said horizontal flanges* supporting said light diffusers on said horizontal flanges with said diffusers spaced from and disposed above said horizontal flanges and lying in a horizontal plane closely adjacent to the horizontal plane of the upper ends of said vertical flanges, *whereby shadows of said vertical flanges cannot be cast on said diffusers.*

3. In a light diffuser system: a horizontal supporting frame adapted to be carried by and disposed below a ceiling structure, said frame comprising longitudinal members and cross members extending between said longitudinal members and defining openings therewith, each member including a vertical flange and a horizontal flange at the lower end of said vertical flange; a light diffuser for each of said openings; *a light source above said vertical flanges and diffusers and comprising one or more lamps, at least one of said lamps being exposed to a plurality of said diffusers for a plurality of said openings to project light on said plurality of diffusers;* and means [separate from] *other than* said members *and diffusers and resting upon said horizontal flanges* [carried by said horizontal flanges] supporting said diffusers in a position spaced from and disposed above said horizontal flanges and in a horizontal plane closely adjacent to the horizontal plane of the upper ends of said vertical flanges, *whereby shadows of said vertical flanges cannot be cast on said diffusers.*

4. In a light diffuser system: a horizontal supporting frame adapted to be carried by and disposed below a ceiling structure, said frame comprising longitudinal members and cross members extending between said longitudinal members and defining openings therewith, each member including a vertical flange and a horizontal flange at the lower end of said vertical flange; a frame structure for each opening resting upon the horizontal flanges defining such openings; [and] a light diffuser resting on each frame structure and disposed substantially entirely in a horizontal plane contiguous the horizontal plane of the upper ends of said vertical flanges and with said light diffuser spaced from and disposed above said horizontal flanges; *a light source above said vertical flanges and diffusers and comprising one or more lamps, at least one of said lamps being exposed to a plurality of said diffusers for a plurality of said openings to project light on said plurality of diffusers; said diffusers being so positioned that shadows created by said one or more lamps of said vertical flanges cannot be cast on said diffusers.*

5. In a light diffuser system: a horizontal supporting ame adapted to be carried by and disposed below a eiling structure, said frame comprising longitudinal mem- ers and cross members extending between said longi- idinal members and defining openings therewith, each iember including a vertical flange and a horizontal flange t the lower end of said vertical flange; channel-shaped overs carried by said members and comprising webs nderlying the horizontal flanges of said members and rms extending upwardly from said webs; [and] light iffusers resting upon the upper ends of said arms across iid openings in a horizontal plane of the upper ends of iid vertical flanges; *a light source above said vertical anges and diffusers and comprising one or more lamps, t least one of said lamps being exposed to a plurality of iid diffusers for a plurality of said openings to project ght on said plurality of diffusers; said diffusers being so ositioned that shadows created by said one or more lamps f said vertical flanges cannot be cast on said diffusers.*

6. In a light diffuser system: a horizontal supporting ame adapted to be carried by and disposed below a eiling structure, said frame comprising longitudinal T- ars and cross T-bars extending between said longitudinal -bars and defining openings therewith, each T-bar in- luding a vertical flange and oppositely directed horizon- il flanges at the lower end of said vertical flange; light iffusing devices for said openings, each device including diffuser; *a light source above said vertical flanges and iffusers and comprising one or more lamps, at least one f said lamps being exposed to a plurality of said dif- isers for a plurality of said openings to project light on iid plurality of diffusers;* and means [separate from] *ther than said* T-bars *and devices carried by said hori- ontal flanges* mounting said devices on said T-bars with iid diffusers in a position spaced from and disposed above iid horizontal flanges and lying in a horizontal plane ontiguous the horizontal plane of the upper ends of said ertical flanges, *whereby shadows of said vertical flanges innot be cast on said diffusers.*

7. In a light diffuser system: a horizontal supporting ame adapted to be carried by and disposed below a eiling structure, said frame comprising longitudinal T- ars and cross T-bars extending between said longitudinal -bars and defining openings therewith, each T-bar includ- ig a vertical flange and oppositely directed horizontal anges at the lower end of said vertical flange; a light iffuser for each of said openings; *a light source above iid vertical flanges and diffusers and comprising one or iore lamps, at least one of said lamps being exposed to plurality of said diffusers for a plurality of said open- igs to project light on said plurality of diffusers;* and ieans *other than* [separate from] said T-bars *and dif- isers* carried by said horizontal flanges and supporting iid diffusers in a position spaced from and disposed above iid horizontal flanges and in a horizontal plane closely djacent to the horizontal plane of the upper ends of said ertical flanges, *whereby shadows of said vertical flanges innot be cast on said diffusers.*

8. In a light diffuser system: a horizontal supporting ame adapted to be carried by and disposed below a eiling structure, said frame comprising longitudinal T- ars and cross T-bars extending between said longitudinal -bars and defining openings therewith, each T-bar in- luding a vertical flange and oppositely directed horizontal anges at the lower end of said vertical flange; a frame tructure for each opening resting upon the horizontal anges defining such openings; [and] a light diffuser rest- ig on each frame structure and disposed substantially ntirely in a horizontal plane continguous the horizontal lane of the upper ends of said vertical flanges and with iid light diffuser spaced from and disposed above said orizontal flanges; *a light source above said vertical flanges nd diffusers and comprising one or more lamps, at least ne of said lamps being exposed to a plurality of said iffusers for a plurality of said openings to project light on said plurality of diffusers; said diffusers being so positioned that shadows created by said one or more lamps of said vertical flanges cannot be cast on said diffusers.*

9. In a light diffuser system: a horizontal supporting frame adapted to be carried by and disposed below a ceiling structure, said frame comprising longitudinal T-bars and cross T-bars extending between said longitudinal T-bars and defining openings therewith, each T-bar including a vertical flange and oppositely directed horizontal flanges at the lower end of said vertical flange; channel-shaped covers carried by said T-bars and comprising webs underlying the horizontal flanges of said T-bars and arms extending upwardly from said webs, [and] light diffusers resting upon the upper ends of said arms across said openings in a horizontal plane continguous the horizontal plane of the upper ends of said vertical flanges; *a light source above said vertical flanges and diffussers and comprising one or more lamps, at least one of said lamps being exposed to a plurality of said diffusers for a plurality of said openings to project light on said plurality of diffusers; said diffusers being so positioned that shadows created by said one or more lamps of said vertical flanges cannot be cast on said diffusers.*

10. In a light diffuser system: a horizontal supporting frame adapted to be carried by and disposed below a ceiling structure, said frame comprising longitudinal T-bars and cross T-bars extending between said longitudinal T-bars and defining openings therewith, each T-bar including a vertical flange and oppositely directed horizontal flanges at the lower end of said vertical flange; channel-shaped covers carried by said T-bars and comprising webs underlying the horizontal flanges of said T-bars and arms extending upwardly from said webs, said arms having opposed ribs extending inwardly and adapted to overlie said horizontal flanges; [and] light diffusers resting upon the upper ends of said arms across said openings in a horizontal plane contiguous the plane of the upper ends of said vertical flanges; *a light source above said vertical flanges and diffusers and comprising one or more lamps, at least one of said lamps being exposed to a plurality of said diffusers for a plurality of said openings to project light on said plurality of diffusers; said diffusers being so positioned that shadows created by said one or more lamps of said vertical flanges cannot be cast on said diffusers.*

11. In a light diffuser system: a horizontal supporting frame adapted to be carried by and disposed below a ceiling structure, said frame comprising longitudinal members and cross members extending between said longitudinal members and defining openings therewith, each member including a vertical flange and a horizontal flange at the lower end of said vertical flange; a frame structure for each opening resting upon the horizontal flanges defining such opening; a light diffuser resting on each frame structure and disposed substantially entirely in a horizontal plane contiguous the horizontal plane of the upper ends of said vertical flanges and with said light diffuser spaced from and disposed above said horizontal flanges; *a light source above said vertical flanges and diffusers and comprising one or more lamps, at least one of said lamps being exposed to a plurality of said diffusers for a plurality of said openings to project light on said plurality of diffusers; said diffusers being so positioned that shadows created by said one or more lamps of said vertical flanges cannot be cast on said diffusers;* each of said frame structures depending substantially below said horizontal flanges.

12. In a light diffuser system: a horizontal supporting frame adapted to be carried by and disposed below a ceiling structure, said frame comprising longitudinal T-bars and cross T-bars extending between said longitudinal T-bars and defining openings therewith, each T-bar including a vertical flange and oppositely directed horizontal flanges at the lower end of said vertical flange; a frame structure for each opening resting upon the horizontal flanges defining said openings; a light diffuser resting on each frame structure and disposed substantially entirely in a horizontal plane contiguous the horizontal plane of the upper ends of said vertical flanges and with said light diffuser spaced from and disposed above said horizontal flanges; *a light source above said vertical flanges and diffusers and comprising one or more lamps, at least one of said lamps being exposed to a plurality of said diffusers for a plurality of said openings to project light on said plurality of diffusers; said diffusers being so positioned that shadows created by said one or more lamps of said vertical flanges cannot be cast on said diffusers; each* of said frame structures depending substantially below said horizontal flanges.

*13. In a light diffuser system as defined in claim 1; each diffuser being a flat horizontal sheet.*

*14. In a light diffuser system as defined in claim 4; each diffuser being a flat horizontal sheet.*

*15. In a light diffuser system as defined in claim 5; each diffuser being a flat horizontal sheet.*

References Cited

The following references, cited by the Examiner, are of record in the patented file of this patent or the original patent.

UNITED STATES PATENTS

| | | | |
|---|---|---|---|
| 2,659,807 | 11/1953 | Wakefield | 240—9 A |
| 3,113,728 | 12/1963 | Boyd | 240—9 |
| 2,659,808 | 11/1953 | Beckwith | 240—9 |
| 2,803,741 | 8/1957 | Guch | 240—9 |
| 2,888,113 | 5/1959 | Schwartz et al. | 240—9 X |
| 2,913,571 | 11/1959 | Smith | 240—9 |
| 3,067,323 | 12/1962 | Kember | 240—9 |

SAMUEL S. MATTHEWS, Primary Examiner

U.S. Cl. X.R.

240—9 A, 51.11